United States Patent
Savekar et al.

(10) Patent No.: US 7,133,046 B2
(45) Date of Patent: Nov. 7, 2006

(54) SYSTEM, METHOD, AND APPARATUS FOR DISPLAY MANAGER

(75) Inventors: Santosh Savekar, Kamataka (IN); Moovaraivendren Subramanian, Kamataka (IN)

(73) Assignee: Broadcom Corporation, Irvine, CA (US)

( * ) Notice: Subject to any disclaimer, the term of this patent is extended or adjusted under 35 U.S.C. 154(b) by 11 days.

(21) Appl. No.: 10/726,180

(22) Filed: Dec. 2, 2003

(65) Prior Publication Data

US 2005/0093869 A1 May 5, 2005

Related U.S. Application Data

(60) Provisional application No. 60/516,387, filed on Oct. 31, 2003.

(51) Int. Cl.
*G06F 13/00* (2006.01)
*G09G 5/36* (2006.01)
*G06K 9/36* (2006.01)

(52) U.S. Cl. ............ 345/502; 345/537; 345/547; 382/232

(58) Field of Classification Search ........ 345/501–503, 345/519, 530, 536–539, 555, 547, 558, 531; 382/232; 348/445, 556; 375/240.02, 240.25, 375/240.01, 240.26
See application file for complete search history.

(56) References Cited

U.S. PATENT DOCUMENTS 5,977,997 A * 11/1999 Vainsencher ........ 345/519
6,256,045 B1 * 7/2001 Bae et al. ........ 348/445
6,614,441 B1 * 9/2003 Jiang et al. ........ 345/539
6,801,710 B1 * 10/2004 Halfant ........ 386/68
2002/0176507 A1 * 11/2002 Ju ........ 375/240.25
2004/0008770 A1 * 1/2004 Okada et al. ........ 375/240.02
2005/0002459 A1 * 1/2005 Lin et al. ........ 375/240.25
2005/0093869 A1 5/2005 Savekar et al.
2005/0093885 A1 5/2005 Savekar et al.

* cited by examiner

*Primary Examiner*—Kee M. Tung
*Assistant Examiner*—Hau Nguyen
(74) *Attorney, Agent, or Firm*—McAndrews, Held & Malloy, Ltd.

(57) ABSTRACT

A system, method, and apparatus for decoding and displaying images utilizing two processors and two memory units. The decode process receives images which are encoded according to a predetermined standard. Included with the encoded images are parameters which facilitate the decode and display processes. The decode process decodes the encoded images and the encoded parameters and stores each image in a separate image buffer, and each set of associated parameters in a buffer descriptor structure associated with the image buffer. The decode process is carried on by the first processor. The display process utilizes the parameters associated with the image to determine the appropriate display order for each image, and then display the image accordingly on a display device, based on the associated parameters. The first processor carries on the display of the image on the display device. The second processor determines the display order for the images. The second processor and the second memory are off-chip.

12 Claims, 5 Drawing Sheets

$I_0$  $B_1$  $B_2$  $P_3$  $B_4$  $B_5$  $P_6$ $I_0$  $P_3$  $B_1$  $B_2$  $P_6$  $B_4$  $B_5$

SYSTEM, METHOD, AND APPARATUS FOR DISPLAY MANAGER

RELATED APPLICATIONS

This application claims priority to U.S. Provisional Application, Ser. No. 60/516,387, filed Oct. 31, 2003, entitled "System, Method, and Apparatus for Display Manager", by Savekar, et. al., which is incorporated herein by reference. This application is also related to "Video Display and Decode Utilizing Off-Chip Processor and DRAM", Application Ser. No. 10/725,974, (now Publication No. 2005-0093884), filed Oct. 31, 2003 (which claims priority to Provisional Application Ser. No. 60/516,490), and "Buffer Descriptor Structures for Communication Between Decoder and Display Manager" Application Ser. No. 10/914,808, (now Publication No. 2005-0093885), filed Aug. 10, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video decoders decode a video bit-stream encoded according to a predetermined standard syntax, such as MPEG-2 or Advanced Video Compression (AVC). An encoder generating a compressed video bit-stream makes a number of choices for converting the video stream into a compressed video bit-stream that satisfies the quality of service and bit-rate requirements of a channel and media. However, decoders have limited choices while decoding the compressed bit stream. The decoder uses the decisions made by the encoder to decode and present pictures at the output screen with the correct frame rate at the correct times, and the correct spatial resolution.

Decoding can be partitioned in two processes—the decode process and the display process. The decode process parses through the incoming bit stream and decodes the bit stream to produce decode images which contain raw pixel data. The display process displays the decoded images onto an output screen at the proper time and at the correct and appropriate spatial and temporal resolutions as indicated in the display parameters received with the stream.

The decoding and display process are usually implemented as firmware in SRAM executed by a processor. The processor is often customized and proprietary, and embedded. This is advantageous because the decoding process and many parts of the displaying process are very hardware-dependent. A customized and proprietary processor alleviates many of the constraints imposed by an off-the-shelf processor. Additionally, the decoding process is computationally intense. The speed afforded by a customized proprietary processor executing instructions from SRAM is a tremendous advantage. The drawbacks of using a customized proprietary processor and SRAM are that the SRAM is expensive and occupies a large area in an integrated circuit. Additionally, the use of proprietary and customized processor complicates debugging. The software for selecting the appropriate frame for display has been found, empirically, to be one of the most error-prone processes. Debugging of firmware for a customized and proprietary processor is complicated because few debugging tools are likely to exist, as compared to an off-the-shelf processor.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a method for displaying images using a circuit in a system that comprises a decoder for decoding encoded images and parameters associated with the images; image buffers for storing the decoded images; parameter buffers for storing the decoded parameters associated with the decoded images; a display engine for receiving the decoded parameters and displaying the decoded images based on the decoded parameters; and a display manager for determining the display order of the decoded images. The system further comprises a first processor and a second processor, and a first memory and a second memory.

The circuit comprises a decoder; image buffers connected to the decoder and configured to store images decoded by the decoder; parameter buffers connected to the decoder and configured to store parameters associated with the images and decoded by the decoder; a display engine connected to the image buffers and the parameter buffers and configured to receive the decoded parameters from the parameter buffers and display the decoded images based on the decoded parameters; and a display manager connected to the display engine and configured to determine the display order for the decoded images based on the decoded parameters. The circuit further comprises a first processor and second processor, and a first memory and a second memory.

The method for displaying images comprises decoding the images; decoding parameters associated with the images; buffering the decoded images; buffering the decoded parameters associated with the decoded images; determining the display order for the decoded images based on the associated decode parameters; and displaying the decoded images based on the associated decoded parameters and based on the determined display order.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
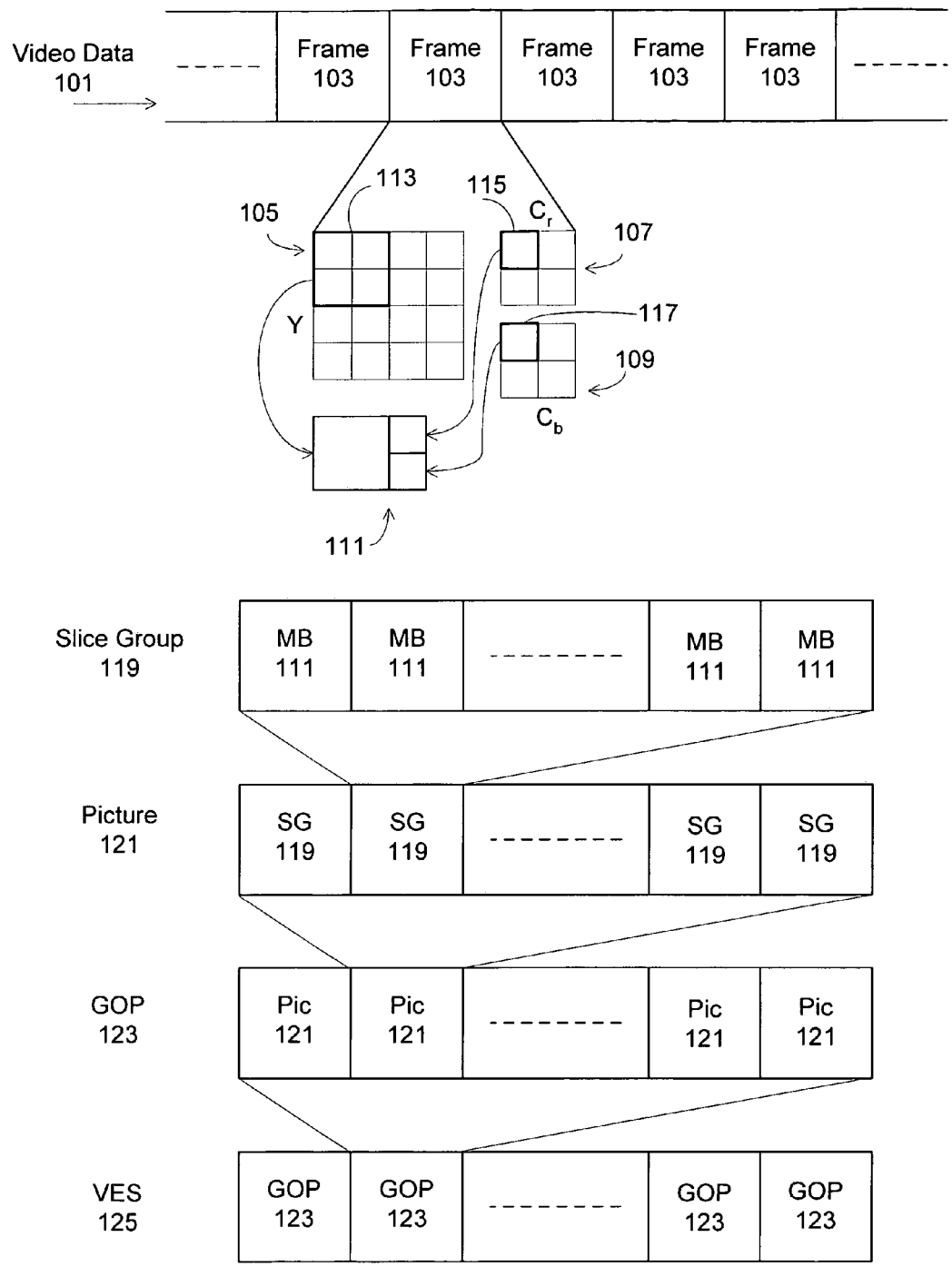
FIG. 1a illustrates a block diagram of an exemplary Moving Picture Experts Group (MPEG) encoding process, in accordance with an embodiment of the present invention.

FIG. 1a illustrates a block diagram of an exemplary Moving Picture Experts Group (MPEG) encoding process of video data 101, in accordance with an embodiment of the present invention. The video data 101 comprises a series of frames 103. Each frame 103 comprises two-dimensional grids of luminance Y, 105, chrominance red Cr, 107, and chrominance blue $C_b$, 109, pixels. The two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring frames 103 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 111 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 111 are compared to portions of other frames 103 (reference frames). When an appropriate (most similar, i.e. containing the same object(s)) portion of a reference frame 103 is found, the differences between the portion of the reference frame 103 and the macroblock 111 are encoded. The location of the portion in the reference frame 103 is recorded as a motion vector. The encoded difference and the motion vector form part of the data structure encoding the macroblock 111. In the MPEG-2 standard, the macroblocks 111 from one frame 103 (a predicted frame) are limited to prediction from portions of no more than two reference frames 103. It is noted that frames 103 used as a reference frame for a predicted frame 103 can be a predicted frame 103 from another reference frame 103.

The macroblocks 111 representing a frame are grouped into different slice groups 119. The slice group 119 includes the macroblocks 111, as well as additional parameters describing the slice group. Each of the slice groups 119 forming the frame form the data portion of a picture structure 121. The picture 121 includes the slice groups 119 as well as additional parameters that further define the picture 121.

The parameters may include, for example, a picture structure indicator (frame/top-field/bottom-field), a progressive picture sequence flag (usually comes in transport layer), a progressive frame flag, pan-scan vectors, an aspect ratio, a decode and display horizontal size parameter, a decode and display vertical size parameter, a top field first parameter, and a repeat first field parameter. It is noted that in varying standards there may be additional or less parameters.

Other parameters may also be functions of defined parameters. For example, the Still Picture Interpolation Mode (SPIM) is a function of the picture structure indicator and the progressive frame/progressive sequence flag. The SPIM represents the display interpolation mode to be used for a still picture and Personal Video Recording (PVR) application such as slow motion when real time decode is turned off. The SPIM controls the way a static frame picture can be displayed onto a screen, for example when a user wishes to pause on a certain frame or when the encoders encode the presentation time stamps of pictures in stream such that decoders are forced to display one frame repetitively. These actions can include displaying the last field, displaying the last displayed top and bottom field pair alternatively, and down-converting the entire frame lines to either top-field or bottom field. The amount of motion between two fields of a frame determines which SPIM mode gives the best visual quality.

Another example, the motion picture interpolation mode (MPIM) is also a function of the picture structure indicator, progressive frame flag, and progressive sequence flag. The MPIM is a one-bit value used while displaying moving pictures. If the bit is set, then a complete progressive frame is output onto the screen instead of breaking it into top and bottom fields. If the bit is reset, then the top or bottom field is sent depending on if the display hardware requires the top or the bottom field.

The progressive frame parameter indicates whether the picture has been encoded as a progressive frame. If the bit is set, the picture has been encoded as a progressive frame. If the bit is not set, the picture has been encoded as an interlaced frame.

The picture structure parameter specifies the picture structure corresponding to the image buffer. Pan scan vectors specify the displayable part of the picture. The aspect ratio indicates the aspect ratio of the image buffer. The decode and display horizontal size parameters indicate the decoded and the displayable horizontal sizes of the image buffer, respectively.

The top field first parameter is a one-bit parameter that indicates for an interlaced sequence whether the top field should be displayed first or the bottom field should be displayed first. When set, the top field is displayed first, while when cleared, the bottom field is displayed first.

The repeat first field is a one-bit parameter that specifies whether the first displayed field of the picture is to be redisplayed after the second field, for an interlaced sequence. For progressive sequence, the repeat first field forms a two-bit binary number along with the top field first parameter specifying the number of times that a progressive frame should be displayed.

Figure 1B:
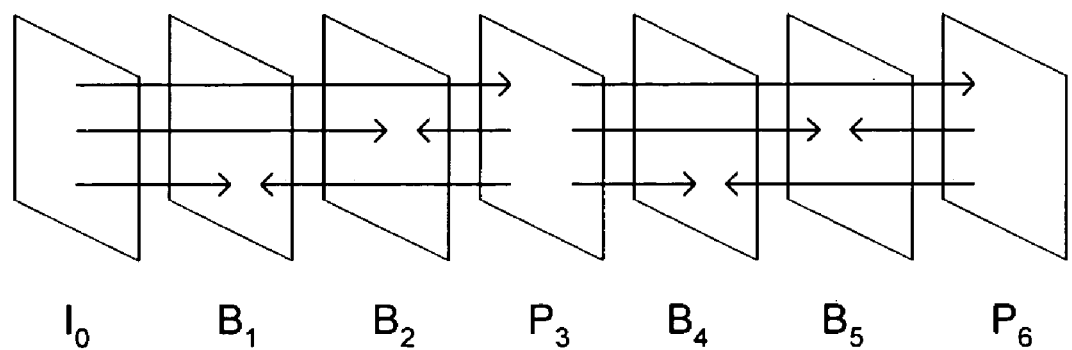
FIG. 1b illustrates an exemplary sequence of frames in display order, in accordance with an embodiment of the present invention.

$I_0$, $B_1$, $B_2$, $P_3$, $B_4$, $B_5$, and $P_6$, FIG. 1b, are exemplary pictures representing frames. The arrows illustrate the temporal prediction dependence of each picture. For example, picture $B_2$ is dependent on reference pictures $I_0$, and $P_3$. Pictures coded using temporal redundancy with respect to exclusively earlier pictures of the video sequence are known as predicted pictures (or P-pictures), for example picture $P_3$ is coded using reference picture $I_0$. Pictures coded using temporal redundancy with respect to earlier and/or later pictures of the video sequence are known as bi-directional pictures (or B-pictures), for example, pictures $B_1$ is coded using pictures $I_0$ and $P_3$. Pictures not coded using temporal redundancy are known as I-pictures, for example $I_0$. In the MPEG-2 standard, I-pictures and P-pictures are also referred to as reference pictures.

Figure 1C:
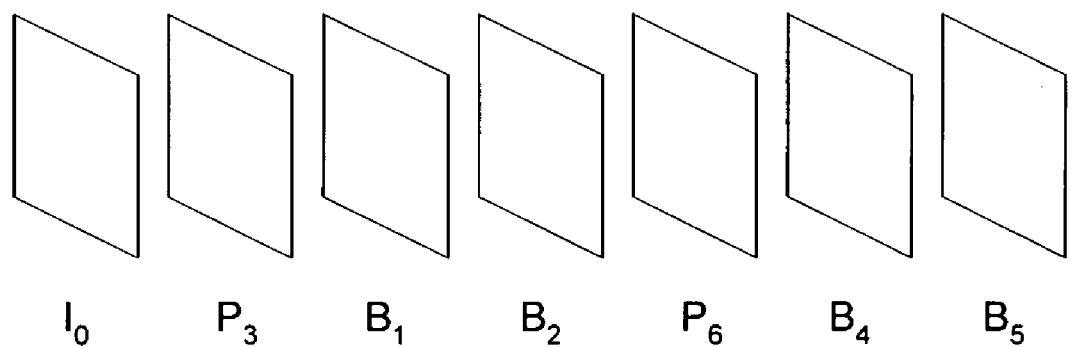
FIG. 1c illustrates an exemplary sequence of frames in decode order, in accordance with an embodiment of the present invention.

The foregoing data dependency among the pictures requires decoding of certain pictures prior to others. Additionally, the use of later pictures as reference pictures for previous pictures requires that the later picture be decoded prior to the previous picture. As a result, the pictures cannot be decoded in temporal display order, i.e. the pictures may be decoded in a different order than the order in which they will be displayed on the screen. Accordingly, the pictures are transmitted in data dependent order, and the decoder reorders the pictures for presentation after decoding. $I_0$, $P_3$, $B_1$, $B_2$, $P_6$, $B_4$, $B_5$, FIG. 1c, represent the pictures in data dependent and decoding order, different from the display order seen in FIG. 1b.

The pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence. Each packet is then associated with a transport header, forming what are known as transport packets.

The transport packets can be multiplexed with other transport packets carrying other content, such as another video elementary stream 125 or an audio elementary stream. The multiplexed transport packets form what is known as a transport stream. The transport stream is transmitted over a communication medium for decoding and displaying.

Figure 2:
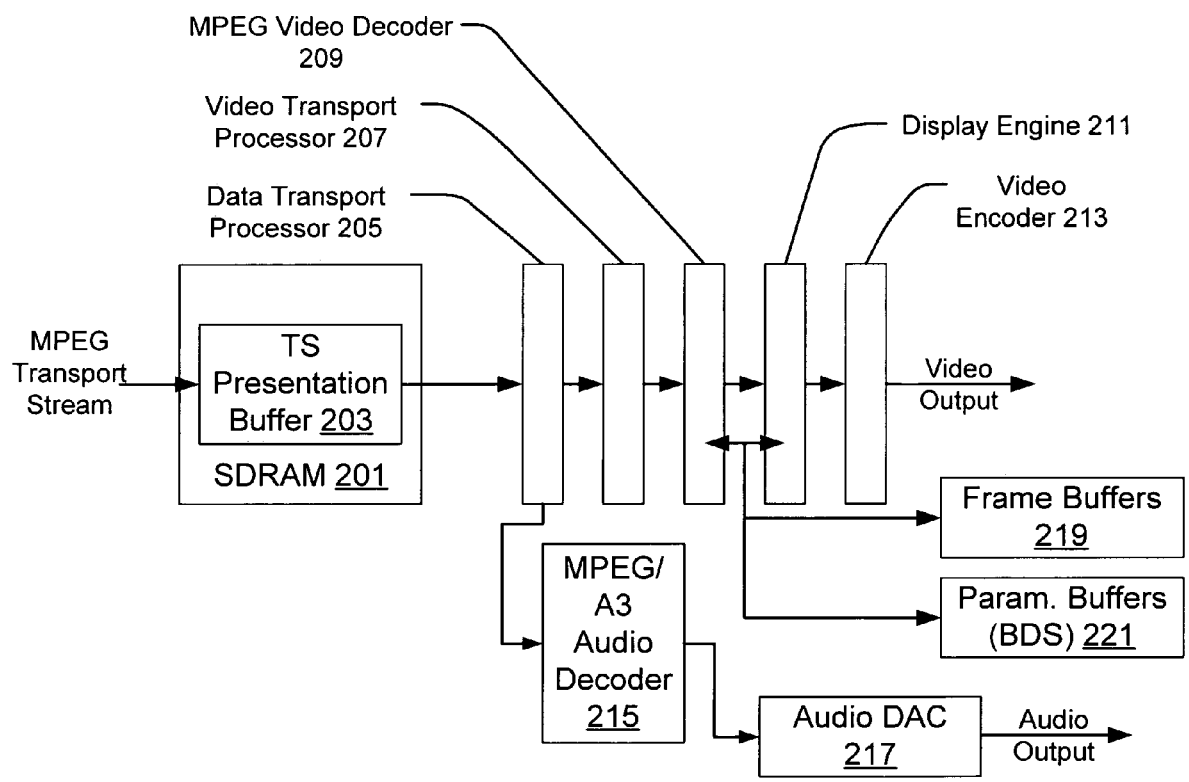
FIG. 2 illustrates a block diagram of an exemplary circuit for decoding the compressed video data, in accordance with an embodiment of the present invention.

FIG. 2 illustrates a block diagram of an exemplary circuit for decoding the compressed video data, in accordance with an embodiment of the present invention. Data is received and stored in a presentation buffer 203 within a Synchronous Dynamic Random Access Memory (SDRAM) 201. The data can be received from either a communication channel or from a local memory, such as, for example, a hard disc or a DVD.

The data output from the presentation buffer 203 is then passed to a data transport processor 205. The data transport processor 205 demultiplexes the transport stream into packetized elementary stream constituents, and passes the audio transport stream to an audio decoder 215 and the video transport stream to a video transport processor 207 and then to a MPEG video decoder 209. The audio data is then sent to the output blocks, and the video is sent to a display engine 211.

The display engine 211 scales the video picture, renders the graphics, and constructs the complete display. Once the display is ready to be presented, it is passed to a video encoder 213 where it is converted to analog video using an internal digital to analog converter (DAC). The digital audio is converted to analog in an audio digital to analog converter (DAC) 217.

The decoder 209 decodes at least one picture, $I_0$, $B_1$, $B_2$, $P_3$, $B_4$, $B_5$, $P_6$ . . . during each frame display period, in the absence of PVR modes when live decoding is turned on. Due to the presence of the B-pictures, $B_1$, $B_2$, the decoder 209 decodes the pictures, $I_0$, $B_1$, $B_2$, $P_3$, $B_4$, $B_5$, $P_6$ . . . in an order that is different from the display order. The decoder 209 decodes each of the reference pictures, e.g., $I_0$, $P_3$, prior to each picture that is predicted from the reference picture. For example, the decoder 209 decodes $I_0$, $B_1$, $B_2$, $P_3$, in the order, $I_0$, $P_3$, $B_1$, and $B_2$. After decoding $I_0$ and $P_3$, the decoder 209 applies the offsets and displacements stored in $B_1$ and $B_2$, to the decoded $I_0$ and $P_3$, to decode $B_1$ and $B_2$. In order to apply the offset contained in $B_1$ and $B_2$, to the decoded $I_0$ and $P_3$, the decoder 209 stores decoded $I_0$ and $P_3$ in memory known as frame buffers 219. The display engine 211, then displays the decoded images onto a display device, e.g. monitor, television screen, etc., at the proper time and at the correct spatial and temporal resolution.

Since the images are not decoded in the same order in which they are displayed, the display engine 211 lags behind the decoder 209 by a delay time. In some cases the delay time may be constant. Accordingly, the decoded images are buffered in frame buffers 219 so that the display engine 211 displays them at the appropriate time. Accomplishing a correct display time and order, the display engine 211 uses various parameters decoded by the decoder 209 and stored in the parameter buffer 221, also referred to as Buffer Descriptor Structure (BDS).

Figure 3:
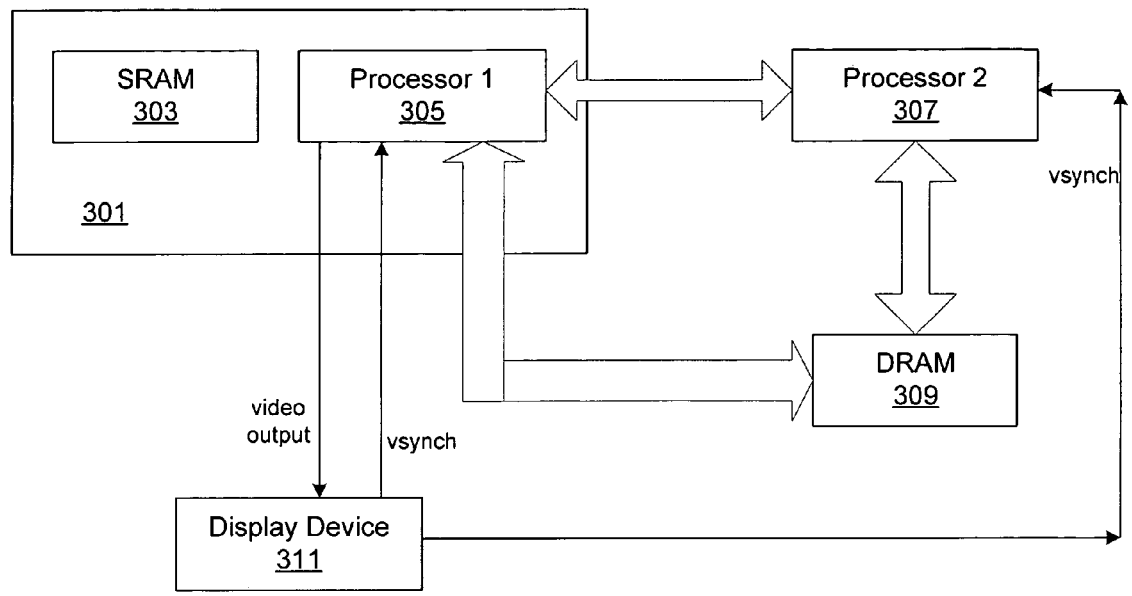
FIG. 3 illustrates a block diagram of an exemplary decoder and display engine unit for decoding and displaying video data, in accordance with an embodiment of the present invention.

FIG. 3 illustrates a block diagram of an exemplary decoder and display engine unit for decoding and displaying video data, in accordance with an embodiment of the present invention. The decoder and display engine work together to decode and display the video data. Part of the decoding and displaying involves determining the display order of the decoded frames utilizing the parameters stored in parameter buffers.

A conventional system may utilize one processor to implement the decoder 209 and display engine 211. The decoding and display process are usually implemented as firmware in SRAM executed by a processor. The processor is often customized and proprietary, and embedded. This is advantageous because the decoding process and many parts of the displaying process are very hardware-dependent. A customized and proprietary processor alleviates many of the constraints imposed by an off-the-shelf processor. Additionally, the decoding process is computationally intense. The speed afforded by a customized proprietary processor executing instructions from SRAM is a tremendous advantage. The drawbacks of using a customized proprietary processor and SRAM are that the SRAM is expensive and occupies a large area in an integrated circuit. Additionally, the use of proprietary and customized processor complicates debugging. The software for selecting the appropriate frame for display has been found, empirically, to be one of the most error-prone processes. Debugging of firmware for a customized and proprietary processor is complicated because few debugging tools are likely to exist, as compared to an off-the-shelf processor.

The functionality of the decoder and display unit can be divided into three functions. One of the functions can be decoding the frames, another function can be displaying the frames, and another function can be determining the order in which a decoded frame shall be displayed.

Referring now to FIG. 3, there is illustrated a block diagram of the decoder system in accordance with an embodiment of the present invention. The second processor 307 oversees the process of selecting a decoded frame from the DRAM 309 for display and notifies the first processor 305 of the selected frame. The second processor 307 executes code that is also stored in the DRAM 309. The second processor 307 can comprise an "off-the-shelf" processor, such as a MIPS or RISC processor. The DRAM 309 and the second processor 307 can be off-chip. The system comprises a processor 305, a memory unit (SRAM) 303, a processor 307, and a memory unit (DRAM) 309.

The first processor 305 oversees the process of decoding the frames of the video frames, and displaying the video images on a display device 311. The first processor 305 may run code that may be stored in the SRAM 303. The first processor 305 and the SRAM 303 are on-chip devices, thus inaccessible by a user, which is ideal for ensuring important, permanent and proprietary code cannot be altered by a user. The first processor 305 decodes the frames and stores the decoded frames in the DRAM 309.

The process of decoding and display of the frames can be implemented as firmware executed by one processor while the process for selecting the appropriate frame for display can be implemented as firmware executed by another processor. Because the decoding and display processes are relatively hardware-dependent, the decoding and display processes can be executed in a customized and proprietary processor. The firmware for the decoding and display processes can be implemented in SRAM.

On the other hand, the process for selecting the frame for display can be implemented as firmware in DRAM that is executed by a more generic, "off-the-shelf" processor, such as, but not limited to, a MIPS processor or a RISC processor. The foregoing is advantageous because by offloading the firmware for selecting the frame for display from the SRAM, less space on an integrated circuit is consumed. Additionally, empirically, the process for selecting the image for display has been found to consume the greatest amount of time for debugging. By implementing the foregoing as firmware executed by an "off-the-shelf" processor, more debugging tools are available. Accordingly, the amount of time for debugging can be reduced.

Figure 4:
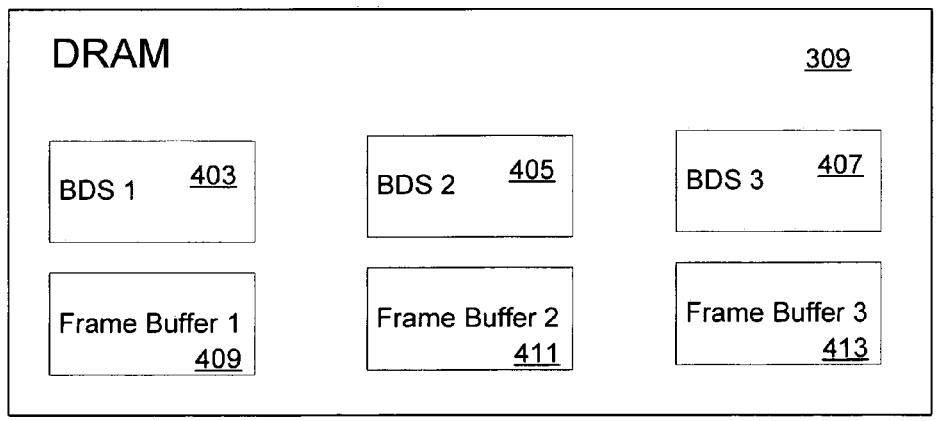
FIG. 4 illustrates a dynamic random access memory (DRAM) unit 309, in accordance with an embodiment of the present invention.

FIG. 4 illustrates a dynamic random access memory (DRAM) unit 309, in accordance with an embodiment of the present invention. The DRAM 309 may contain frame buffers 409, 411 and 413 and corresponding parameter buffers or BDSs 403, 405 and 407.

In one embodiment of the present invention, the video data is provided to the processor 305. The display device 311 sends a vertical synchronization (vsynch) signal every time it is finished displaying a frame. When a vsynch is sent, the processor 305 may decode the next frame in the decoding sequence, which may be different from the display sequence as explained hereinabove. Since the second processor may be an "off-the-shelf" processor, real-time responsiveness of the second processor may not be guaranteed. To allow the second processor 307 more time to select the frame for display, it is preferable that the second processor 307 selects the frame for display at the next vsynch, responsive to the present vsynch. Accordingly, after the vsynch, the first processor 305 loads parameters for the next decoded frame into the BDS. The second processor 307 can determine the next frame for display, by examining the BDS for all of the frame buffers. This decision can be made prior to the decoding of the next decoded frame, thereby allowing the second processor 307 a window of almost one display period prior to the next vsynch for determining the frame for display, thereat. The decoded frame is then stored in the appropriate buffer.

The process of displaying the picture selected by the second processor prior to the latest vsynch may also be implemented utilizing the second processor. Consequently, the first processor may not need to interface with the display hardware and may work based only on the vsynchs and the signals for determining which frame to overwrite from the second processor. The processor 307 notifies the processor 305 of the decision regarding which frame should be displayed next. When the display device 311 sends the next vsynch signal, the foregoing is repeated and the processor 305 displays the frame that was determined by processor 307 prior to the latest vsynch signal. The processor 305 gets the frame to display and its BDS from the DRAM 309, applies the appropriate display parameters to the frame, and sends it for display on the display device 311.

Figure 5:
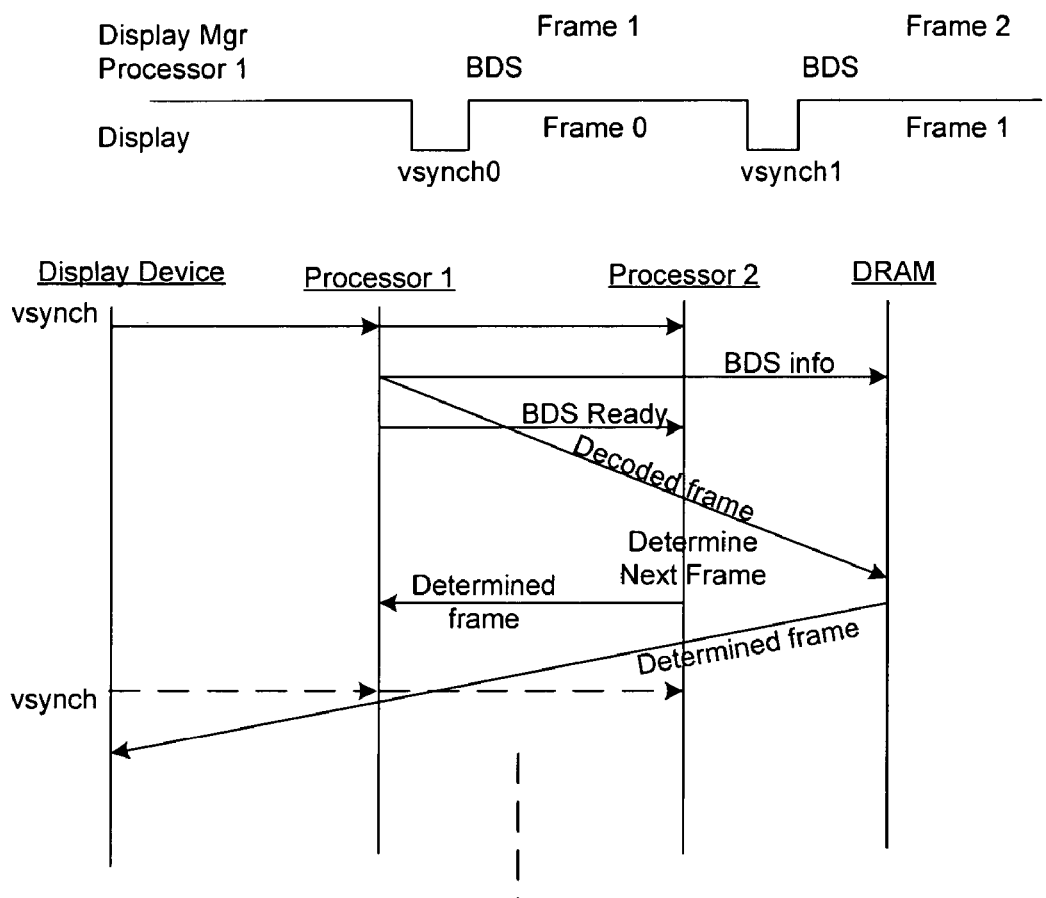
FIG. 5 illustrates a timing diagram of the decoding and displaying process, in accordance with an embodiment of the present invention.

FIG. 5 illustrates a timing diagram of the decoding and displaying process, in accordance with an embodiment of the present invention. Processor 307 may be an off-the-shelf generic processor, and it may be off-chip. If the first processor 305 were the only processor in the system, the code would only be in SRAM 303, and the processor 305 would be able to process, i.e. decode an image and determine the next image to display during a short period after the vsynch, then display that image during the time before the next vsynch signal. However, that is not desirable in this system since, as mentioned hereinabove, utilizing only the on-chip processor 305 and the SRAM 303 may be more costly than utilizing a second processor 307 and a DRAM 309. The second processor 307 and the DRAM 309 may be more economical.

When the vsynch occurs the processor 307 determines the appropriate image to display next according to the correct order. It is desirable to provide processor 307 with the necessary information to determine the next frame for display early, to afford the processor 307 more time to determine the next frame for display. As a result, when, for instance, a vsynch 0 occurs, processor 305 and processor 307 are notified. Processor 305 may then load the BDS information associated with the frame that is being currently decoded onto the DRAM 309 and notifies the processor 307. The processor 307 determines the appropriate frame to display next to maintain the correct order of frames based on the BDS. Meanwhile, the processor 305 also begins displaying the current display frame, e.g. frame 0, and decoding the current decode frame utilizing instructions stored on the SRAM 303. Once the decoding of the current frame is complete, the processor 305 may send the decoded frame to the DRAM 309. Once the processor 307 determines, for instance, frame 1 that needs to be displayed next, processor 307 sends the determination information to processor 305. At vsynch 1, the foregoing is repeated and processor 305 displays the frame selected after vsynch 0, e.g. frame 1, from the DRAM 309.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for displaying images, said system comprising:
   a first processor for decoding the images in a decoding order;
   a first memory for storing a first plurality of instructions that are executed by the first processor;
   a second processor for determining a display order for the images, wherein the display order is different from the decoding order;
   a second memory for storing a second plurality of instructions that are executed by the second processor; and
   wherein the first processor prepares the decoded images for display in the display order determined by the second processor.

2. The system of claim 1, wherein the first processor provides parameters associated with the images, and wherein the second processor determines the display order based on the parameters associated with the images that are provided by the first processor.

3. The system of claim 1, wherein the second memory stores parameters provided by the first processor, and wherein the second processor determines the display order based on the parameters stored in the second memory.

4. The system of claim 1, wherein the second memory stores the decoded images.

5. The system of claim 1, wherein the first memory comprises an SRAM, and wherein the second memory comprises a DRAM.

6. The system of claim 1, wherein between a vertical synchronization signal and a next vertical synchronization signal, the first processor decodes a particular one of the images, and wherein the second processor selects a display image for display following the next vertical synchronization signal.

7. The system of claim 6, wherein the first processor provides parameters associated with the particular one of the images, and wherein the second processor selects the display image based on the parameters associated with the particular one of the images.

8. The system of claim 6, wherein the second processor notifies the first processor of the display images, and wherein the first processor prepares the display image for display following the next vertical synchronization signal.

9. The system of claim 1, wherein the images are selected from a group consisting of pictures, frames, top fields, and bottom fields.

10. A circuit for displaying images, said circuit comprising:
    a processor; and
    a memory connected to the processor, said memory storing a plurality of instructions that are executable by the processor, wherein execution of the instructions by the processor causes:
        decoding the images in a decoding order, wherein decoding the images comprises decoding a particular image between a vertical synchronization signal and a next vertical synchronization signal;
        receiving an indication from another processor between the vertical synchronization signal and the next vertical synchronization signal, said indication indicating a display image in a display order, wherein the display order is different from the decoding order; and
        preparing the display image for display following the next vertical synchronization signal.

11. The circuit of claim 10, wherein execution of the instructions also causes:
    writing the decoded images to another memory.

12. The circuit of claim 10, wherein execution of the instructions also causes:
    writing the parameters to the another memory.

* * * * *